(12) United States Patent
Sprogar et al.

(10) Patent No.: US 11,911,927 B2
(45) Date of Patent: *Feb. 27, 2024

(54) WOOD-ENCASED PENCIL

(71) Applicant: SCHWAN-STABILO COSMETICS GMBH & CO. KG, Heroldsberg (DE)

(72) Inventors: Christian Sprogar, Bubenreuth (DE); Ingolf Kahle, Rückersdorf (DE); Thomas Heidenreiter, Nuremberg (DE)

(*) Notice: Subject to any disclaimer, the term of this patent is extended or adjusted under 35 U.S.C. 154(b) by 0 days.

This patent is subject to a terminal disclaimer.

(21) Appl. No.: 17/254,294

(22) PCT Filed: Jun. 19, 2019

(86) PCT No.: PCT/EP2019/066183
§ 371 (c)(1),
(2) Date: Dec. 20, 2020

(87) PCT Pub. No.: WO2019/243415
PCT Pub. Date: Dec. 26, 2019

(65) Prior Publication Data
US 2021/0260789 A1 Aug. 26, 2021

(30) Foreign Application Priority Data
Jun. 19, 2018 (DE) .......................... 202018103461

(51) Int. Cl.
*B27K 3/34* (2006.01)
*B43K 19/14* (2006.01)
*A45D 40/20* (2006.01)
*B43K 19/02* (2006.01)
*C08L 3/02* (2006.01)
*C08L 29/04* (2006.01)

(52) U.S. Cl.
CPC .............. *B27K 3/343* (2013.01); *B43K 19/14* (2013.01); *C08L 3/02* (2013.01); *A45D 40/20* (2013.01); *B43K 19/02* (2013.01); *C08L 29/04* (2013.01)

(58) Field of Classification Search
CPC ................................ B43K 19/14; A45D 40/20
See application file for complete search history.

(56) References Cited

U.S. PATENT DOCUMENTS

| 1,785,571 | A | | 12/1930 | Allen | |
| 5,770,319 | A | * | 6/1998 | Franich | ................. B27K 3/156 |
| | | | | | 427/297 |
| 6,632,326 | B1 | | 10/2003 | Hirano et al. | |
| 8,945,706 | B2 | * | 2/2015 | Wang | ....................... B27K 3/15 |
| | | | | | 428/305.5 |
| 2013/0252010 | A1 | * | 9/2013 | Chen | ..................... C09D 15/00 |
| | | | | | 427/532 |
| 2014/0322548 | A1 | | 10/2014 | Boldizsar | |

FOREIGN PATENT DOCUMENTS

| AU | 4207396 A | 8/1996 |
| CA | 2061749 C | 8/1992 |
| CN | 1817588 A | 8/2006 |
| CN | 101637931 A | 2/2010 |
| CN | 101945955 A | 1/2011 |
| CN | 105216084 A | 1/2016 |
| CN | 105747208 A | 7/2016 |
| CN | 106691925 A | 5/2017 |
| DE | 29914099 U1 | 11/1999 |
| DE | 69230233 T2 | 7/2000 |
| DE | 102011055188 A1 | 5/2013 |
| EP | 0502640 A1 | 9/1992 |
| GB | 770583 A | 3/1957 |
| JP | S58212407 | 12/1983 |
| JP | H05124011 A | 5/1993 |
| JP | H08197509 A | 8/1996 |
| JP | H10323807 A | 12/1998 |
| JP | 2001096511 A | 4/2001 |
| JP | 2017052853 A | 3/2017 |
| JP | 2018051837 A | 4/2018 |
| WO | 2009104779 A1 | 8/2009 |
| WO | 2017076960 A1 | 5/2017 |

OTHER PUBLICATIONS

European Patent Office, International Search Report for International Application No. PCT/EP2019/066183, dated Oct. 9, 2019.
European Patent Office, Written Opinion of the International Searching Authority for International Application No. PCT/EP2019/066183, dated Oct. 9, 2019.
European Patent Office, International Search Report for International Application No. PCT/EP2019/066189, dated Oct. 9, 2019.
European Patent Office, Written Opinion of the International Searching Authority for International Application No. PCT/EP2019/066189, dated Oct. 9, 2019.
Hensel et al., *Eupatorium perfoliatum* L .: Phytochemistry, traditional use and current applications, Journal of Ethnopharmacology, 138 (2011) 641-651.

* cited by examiner

*Primary Examiner* — David P Angwin
*Assistant Examiner* — Bradley S Oliver
(74) *Attorney, Agent, or Firm* — Bradley Arant Boult Cummings LLP; Jacob W. Neu

(57) ABSTRACT

A description is given of a wood-encased pencil comprising a casing and a core, the casing consisting of wood material impregnated with a saccharide component, the saccharide component comprising at least one mono-, di- or oligosaccharide in solution in a vehicle.

23 Claims, No Drawings

WOOD-ENCASED PENCIL

The invention relates to a wood-encased pencil suitable for accommodating a core with volatile constituents.

Wood-encased pencils have a diversity of uses. They consist in general of a core, which may be a lead-pencil, pencil-crayon or cosmetic core or any other core, inserted into a casing which consists of wood or a woodlike material. Wood is a popular material on account of its renewable raw material status and its pleasing tactility. Such pencils are typically produced by milling grooves into a slat, the cores being placed into the grooves. Thereafter a second slat is placed on, with matching opposite grooves, which cover the cores. The two slats are then glued to one another and the pencils are then cut from the slats. Wood-encased pencils typically have a point, which can be sharpened with a sharpener, and a rear end, which may be protected with a coating and/or a cap.

Cores which are used in such pencils may be produced by diverse materials depending on application. The use of pencil compounds formed from pigment and binder presents no problems. Because these cores contain virtually no volatile constituents, there are also no problems with evaporation of volatile fractions.

Within the field of cosmetology, however, it is common to use stick compounds comprising both non-volatile and volatile constituents. The purpose of the volatile constituents is generally to render the compound easy to apply and to influence the application and retention properties. The problem with such sticks is that volatile constituents may gradually be given off, causing the core on the one hand to become more brittle and fragile and less convenient to apply, and on the other hand causing the core to contract as a result of the volatile constituents given off, so that the core no longer sits firmly in the pencil sheath.

Attempts have already been made to overcome this problem by using a polymer casing rather than a wood casing. Many users, however, prefer wood-encased pencils because of the tactility. It is also possible to cover the wood pencil with a solvent-tight coating. Here again, however, the tactility and the sensation when using the pencil are impaired.

Attempts have also already been made to impregnate the wood pores with synthetic substances, such as acrylate, for example. This as well, however, causes the wood pencil to lose the impression it gives of being a natural product. Moreover, such methods entail a high level of technical complexity.

It was an object of the invention, therefore, to provide a wood casing for wood-encased pencils that maintains the natural-product character of the wood pencil, continues to give the sensation of a wood pencil when gripped, permits decoration if desired, and endows the wood or woodlike material with barrier properties, without detriment to tactility and appearance.

A further aim is to provide a method with which a wood casing can be provided with barrier properties, this method being able to be carried out simply and without great technical complexity.

The problems specified above are solved with a wood-encased pencil as defined in the claims.

It has surprisingly been found that a wood casing which has been impregnated with a saccharide component as defined in the claims exhibits barrier properties which prevent the escape, completely or to a large extent, of volatile constituents of the kind typically found in cosmetic pencils, but also in pencil crayons and other kinds of pencils, even in the course of prolonged storage. It is possible accordingly to provide readily storable wood pencils in high quality wherein the good properties of the core are retained for a long time. It has been found, moreover, that the wood material treated in accordance with the invention can if desired be given customary decoration by means of varnishing, embossing, screen-printing, labelling and other customary methods.

The saccharide component of the invention comprises at least one saccharide, as defined below, in solution in a vehicle. There may be further constituents present. Without being tied to a theory, it is assumed that the saccharide component of the invention which comprises at least one saccharide, i.e. a compound having a multiplicity of hydroxyl groups, is able to fill the pores in the wood, which are then held by adsorption or binding via OH groups which are plentiful in the wood. Particularly if the saccharide component comprises at least one kind of oligosaccharides, these saccharides, as chainlike or coillike molecules, are held particularly well in the pores. This structure forms a barrier which hinders or even prevents the escape of volatile materials. It is assumed, furthermore, without being attached to any theory, that this structure "holds on" to volatile constituents, in other words hindering them from migrating onwards and escaping via the tip of the pencil. Because the wood material is constructed on the basis of saccharide units, the compatibility between saccharide component and wood material is high. It has been found that when the casing is impregnated with the saccharide component of the invention, it is possible to lower the weight loss from cores comprising volatile constituents to below 4% by weight, measured after 12 weeks of storage at elevated temperature by a test as described in the examples. With the materials typically used, the weight loss may be 6% by weight or more, denoting a considerable detraction from the quality of the core compound and often rendering the pencils unusable.

By virtue of the fact that volatile constituents are retained by the saccharide component and not transported further, there is also compensation in the atmosphere in the wood that prevents further volatile molecules departing the core.

The advantageous properties are achieved if the material used for the casing is impregnated with a saccharide component. In connection with the present invention, wood material refers to any lignocellulose material suitable for the production of casings. This term, accordingly, embraces not only natural wood but also treated wood, wood material produced from woodchips or wood constituents, such as pressboard wood, plywood, groundwood and the like. The term "wood material" as used in accordance with the invention is therefore intended to cover any lignocellulosic material derived from wood. All of these materials are composed of cellulose, i.e. of a polysaccharide constructed from glucose molecules in $\beta$-1,4-glycosidic bonding.

The saccharide component of the invention used for impregnating or saturating the casing is a solution with at least one mono-, di- or oligosaccharide or a mixture thereof. Further constituents may add to these. At least one saccharide is necessary, ensuring in particular the compatibility with the wood material. The term "saccharide" encompasses mono-, di- and oligosaccharides, i.e. molecules composed of one, two or more sugar units, the sugar unit being an aldose or ketose having 4 to 6, more particularly 5 or 6, preferably 6 carbon atoms. Examples of suitable monosaccharides are glucose, galactose, mannose, fructose, arabinose, xylose, or ribose. Highly suitable as a monosaccharide or as a building block of di- and oligosaccharides are glucose, galactose, fructose or mixtures thereof. Examples of disaccharides are maltose, lactose, sucrose and mixtures thereof.

Oligosaccharide here refers to saccharides composed of up to 30—for example, 3 to 25—sugar units, with suitable examples being oligosaccharides composed of 3 to 20 glucose units. An example of an oligosaccharide is maltodextrin, which may be obtained by enzymatic degradation of starch. Maltodextrins exist with different chain lengths. Especially suitable are those having a dextrose equivalent of 3 to 20, e.g. 10 to 20.

The saccharide component comprises at least one mono-, di- or oligosaccharide, but may also comprise a mixture of different monosaccharides, different disaccharides, different oligosaccharides, or a mixture of different kinds of saccharide. It has been found that a mixture which comprises at least one oligosaccharide yields particularly good results—for example, a mixture of at least one monosaccharide and at least one oligosaccharide. It has been found that the fluctuations in loading are higher if only monosaccharides are used for the impregnation. Without being tied to one theory it is assumed that the small monosaccharide molecules are able to escape more easily again from the pores in the wood, particularly while vehicle is still present, by comparison with the larger oligosaccharides, which no longer escapes so readily from the pores.

It is assumed, furthermore, that by means of OH groups on oligosaccharides and wood material, through crosslinking and/or adsorption, there is a structuring of the chains that ensures anchoring of the structure formed and hence a permanent barrier. It is assumed that this structuring by the saccharides generates the particularly compatible impregnation of the wood material and at the same time the high imperviosity.

In the saccharide component, the saccharide or saccharides is or are present as solution(s) in a liquid vehicle. The liquid vehicle may be any solvent which is able to dissolve the saccharide sufficiently, is compatible with wood material, does not adversely alter the wood and the saccharide component, and is not harmful to humans, animals and the environment. Aqueous solutions, particularly water, are suitable for this purpose. Water is typically used.

The fraction of saccharides in the saccharide component is in a range from 0.5 to 60% by weight, based in each case on the weight of the completed impregnation solution, with the fraction of saccharide being dependent on factors including the nature of the particular saccharides used, the nature of the wood material and the temperature and duration of the impregnating. A fraction of 15 to 55% by weight, for example is suitable. Good results can be achieved with a fraction of 25 to 40% by weight.

It has been found, moreover, that the addition of a polyol to the saccharide component further improves the result, a polyol here being a linear organic compound which has at least 4 hydroxyl groups but no other functional groups. Examples of a polyol are pentaerythritol or polyvinyl alcohol or a mixture thereof. Polyvinyl alcohols are available in numerous grades. Polyvinyl alcohols suitable for the present invention are those which at processing temperature and room temperature are fluid and are compatible with the other constituents, meaning that they remain in solution and are not precipitated. A suitable example is partially saponified PVA of the kind available commercially, preferably a PVA having a degree of hydrolysis of about 75% to 90%. Good results are achieved with polyvinyl alcohol having a viscosity in the range from 3 to 4 mPa·s, measured on a 4% strength solution at room temperature. Without being tied to any theory, it is assumed that the polyol contributes to effective crosslinking and compatibility and so further reinforces the sealing of the pores. If a polyol is used, the fraction thereof is preferably in a range between 0.5 and 8% by weight, e.g. 3 to 6% by weight, based in each case on the weight of the completed composition.

The wood-encased pencil of the invention can be produced by impregnating wood material used for producing the pencil with the saccharide component as described above over a period of 10 minutes to 24 hours at a temperature in the range from 0 to 90° C. The pressure is not critical and may be between 1 and 20 bar; sub-atmospheric pressure may also be employed. The impregnation can be carried out under ambient conditions, a particular advantage. Also suitable, for example, is an impregnation carried out at 5 to 12 bar for 5 to 12 hours.

It has been found that the wood material ought to spend at least 10 minutes in the impregnating solution, since otherwise the impregnation is not sufficiently thorough. The optimum period of time in each case may be selected simply, depending on the thickness of the wood material, the particular impregnating solution used and the temperature employed. Impregnation for more than 24 hours produces no further effect and is therefore uneconomic. In one embodiment the wood material is placed into the impregnating solution, i.e. the saccharide component, overnight, i.e. for about 8 to 14 hours, preferably under ambient conditions. Likewise possible is the placing of the wood material, also dependent on the thickness, into an impregnating solution for 30 to 180 minutes with elevated temperature, e.g. at 30 to 90° C., more particularly 40 to 50° C. Impregnation may be carried out under ambient pressure or elevated pressure, as for example at a pressure of about 1 to 20 bar, e.g. 3 to 12 bar.

The temperature of the impregnation may be between 0 and 90° C. This likewise makes the method very simple, since a temperature in the region of room temperature can also be employed, meaning that there is no need for heating. The higher the temperature, the quicker the impregnation.

Both the wood material provided for producing the casing and the wood casing after it has been formed may be impregnated in the saccharide component.

The wood-encased pencil of the invention can therefore be produced very easily without any need to use environmentally harmful constituents and without great cost and complexity, since the wood material can simply be inserted into the saccharide component.

When impregnation is at an end, the completed pencils may either be left to lie at room temperature for drying or else may be dried in a known way by means of elevated temperature, in a drying cabinet, for example.

It has been found that a pencil sleeve impregnated with the saccharide component of the invention forms a good barrier to the evaporation of solvents such as volatile silicones and volatile hydrocarbons and that evaporation can be limited considerably. The pencils nevertheless remain amenable to sharpening and can be processed and decorated in a customary way. Furthermore, they retain the desired appealing tactility and appearance.

Without being tied to a theory, it is assumed that during the impregnation, the free OH groups of the cellulose fibres of the wood material become crosslinked or associated with the OH groups of the polysaccharides and polyalcohols, thereby filling up free volume within the wood pores after drying.

The impregnation process may take place at room temperature, as is preferred, or else at other temperatures. The pressure may be either ambient pressure or moderately elevated pressure, e.g. a pressure of up to 10 bar. In one embodiment of the method of the invention, the wood material is first evacuated by the application of moderate sub-atmospheric pressure. Thereafter the impregnating solution is added. The wood material is subsequently dried. The drying may take place at room temperature or else at elevated temperature in order to reduce the drying time. Drying may take place in an inherently customary way. For example, the wood material may be removed from the impregnating solution and left to drip dry for up to 2 hours. After that it is customarily dried at elevated temperature, e.g. in a range from 30 up to no more than the boiling temperature of the solvent, e.g. 100° C. in the case of water, until the wood material is dry; the drying conditions in this case ought to be set such that neither the wood material nor the saccharide component taken up into the wood is damaged. The skilled person knows of such methodologies. For example, the temperature can be increased in stages up to at most the temperature of the boiling point of the solvent—for example, the drying cabinet can be heated to 50 to 70° C. within 15 to 60 minutes, this temperature can then be held for 1 to 5 hours, and then heating can be carried out within 15 to 60 minutes up to at most the temperature of the boiling point of the solvent, e.g. up to 100° C. After that, this temperature can be held at least until the weight is constant, such as for up to 24 hours, e.g. 8 to 14 hours overnight. A vacuum may be applied in order to accelerate drying. The optimum drying conditions in respect of time, temperature and, where appropriate, pressure may easily be determined by the skilled person by means of routine tests.

To determine the barrier properties of wood material, a test method as follows was carried out.

Wood material was impregnated as described above. Wooden boats were then formed from the wood material, and a core material was enclosed in these boats. These boats were then kept at 45° C. for 12 weeks. From time to time and after 12 weeks, the weight loss was determined. The boats were subsequently opened and the appearance of the core was examined. In these tests it was found that boats made of untreated cedar wood had after just 10 weeks lost so many volatile constituents that the pencils were no longer usable. The cores had contracted. In the case of boats treated with the saccharide component of the invention, the weight loss after 12 weeks was low, i.e. below 4% by weight and down to 1.69% by weight.

In the case of this test, the quality of the wood material is regarded as sufficient in terms of imperviosity if after 12 weeks at 45° C. the content of volatile constituents had not altered by more than 10% by weight. This value was achieved by all saccharide components according to the invention.

The invention is elucidated further in the examples which follow.

EXAMPLE 1

Wood material was placed into an impregnating solution containing 40% by weight of glucose in aqueous solution. The wood material was subsequently dried as follows:
Preliminary drying/drip drying 1 h at 25° C.
Heating to 65° C. within 30 minutes
3 h at 65° C.
Heating to 100° C. within 30 minutes
12 h at 100° C.
After cooling, the wood material was processed into a boat into which a core had been inserted. Moreover, for comparison, boats of untreated wood material were produced, and were equipped with the same core compound.

The composition of the core compound embedded into the cedar wood boats was as follows:

TABLE 1

| INCI-US | K K | Value Unit |
|---|---|---|
| Iron Oxides 77491/77492/77499 | Z F | 28.943% |
| Synthetic Wax | Z B | 14.473% |
| Isododecane | Z B | 12% |
| Polybutene | Z B | 11.182% |
| Hydrogenated Cottonseed Oil | Z B | 6.578% |
| Hydrogenated Polyisobutene | Z B | 5.333% |
| Hydrogenated Polydecene | Z B | 5.333% |
| Hydrogenated Poly(C6-14 Olefin) | Z B | 5.333% |
| *Simmondsia Chinensis* (Jojoba) Seed Oil | Z B | 3.289% |
| Mica 77019 | Z F | 1.973% |
| Ceresin | Z B | 1.579% |
| Ferric Ferrocyanide 77510 | Z F | 1.316% |
| Ozokerite | Z B | 1.315% |
| Microcrystalline Wax | Z B | 1.053% |
| Tocopherol | Z B | 0.25% |
| Ascorbyl Palmitate | Z B | 0.05% |
| | | 100.0000% |

All of the boats were then sealed. The resulting boats were kept in a heating cabinet at 45° C. for 12 weeks. The weight was determined in each case after 1, 2, 3, 4, 10 and 12 weeks and the weight loss was calculated accordingly. All of the values are average values, owing to the use of a plurality of boats for each test. The boats for this purpose were removed from the heating cabinet and weighed after cooling to room temperature.

Boats made of untreated wood material were not impervious to volatile hydrocarbons. After just a week, the pencils were significantly drier, and after 10 weeks they were no longer usable. The cores had contracted. The test was therefore discontinued after 10 weeks.

Conversely, boats made of wood material treated in accordance with the invention were still impervious even after 12 weeks; the weight loss was minimal, being on average 3.77% by weight. It was found that further criteria, such as decoration, sharpenability, processing, appearance, etc., were positively fulfilled. It was noted, however, that the loading quantity varied among the boats.

EXAMPLE 2

Different saccharide components according to the invention were tested. For this purpose, wood material was inserted in each case into an impregnating solution as defined in Table 2. The wood material was subsequently processed to boats, in each of which a core was inserted as shown in Example 1.

In the case of this test, the quality of the wood material was regarded as sufficient in terms of imperviosity if after 12 weeks at 45° C. the weight loss was less than 4% by weight. This value was achieved by all saccharide components according to the invention, as shown in Table 2.

The compositions and the results are shown in Table 2 below.

TABLE 2

| Sample | Glucose | Maltodextrin | Weight loss (%) 45° C., 12 weeks |
|---|---|---|---|
| 1 | | | 6.10 (*) |
| 2 | 40 | | 3.77 |

TABLE 2-continued

| Sample | Glucose | Maltodextrin | Weight loss (%) 45° C., 12 weeks |
|---|---|---|---|
| 3 | | 3 | 2.78 |
| 4 | | 15 | 2.95 |
| 5 | 30 | | 3.27 |

* Test discontinued after 10 weeks

What is claimed is:

1. A pencil, comprising:
    a casing including
        a wood material and
        a saccharide component impregnated in the wood material, the saccharide component comprising at least one monosaccharide and at least one oligosaccharide, wherein a vehicle comprises the saccharide component in a solution; and
    a core enclosed in the casing, the core including volatile constituents, wherein at least 90% by weight of the volatile constituents are retained in the core by the casing.

2. The pencil according to claim 1, wherein the at least one oligosaccharide is constructed of glucose units.

3. The pencil of claim 2, wherein the at least one oligosaccharide constructed of glucose units comprises maltodextrin.

4. The pencil according to claim 1, wherein the at least one monosaccharide is selected from the group consisting of: glucose, galactose, mannose, fructose, arabinose, xylose, ribose, and combinations thereof.

5. The pencil according to claim 1, wherein the saccharide component further comprises a disaccharide selected from the group consisting of: maltose, lactose, sucrose, and combinations thereof.

6. The pencil according to claim 5, wherein the at least one oligosaccharide of the saccharide component comprises maltodextrin with a dextrose equivalent of from 3 to 30.

7. The pencil according to claim 1, wherein the saccharide component further comprises a polyol.

8. The pencil according to claim 7, wherein the polyol is selected from the group consisting of: pentaerythritol, polyvinyl alcohol, and a combination thereof.

9. The pencil according to claim 1, wherein the volatile constituents include at least one of volatile silicones and volatile hydrocarbons.

10. A method of producing a pencil having impregnated wood, the method comprising:
    impregnating wood for from 10 minutes to 24 hours at a temperature of 0° C. to 90° C. with a saccharide component comprising at least one monosaccharide and at least one oligosaccharide, wherein a vehicle comprises the saccharide component in a solution, and
    enclosing a core including volatile constituents in the impregnated wood to produce at least one pencil, wherein at least 90% by weight of the volatile constituents are retained in the core by the impregnated wood.

11. The method according to claim 10, wherein the at least one oligosaccharide is constructed of glucose units.

12. The method according to claim 11, wherein the at least one oligosaccharide constructed of glucose units comprises maltodextrin.

13. The method according to claim 12, wherein the saccharide component further comprises at least one disaccharide.

14. The method according to claim 13, wherein the saccharide component further comprises polyvinyl alcohol.

15. The method according to claim 10, wherein the saccharide component further comprises a polyol selected from the group consisting of: pentaerythritol, polyvinyl alcohol, and a combination thereof.

16. The method according to claim 10, wherein the volatile constituents include at least one of volatile silicones and volatile hydrocarbons.

17. A method of producing a pencil having solvent barrier properties, the method comprising:
    impregnating a wooden pencil casing for from 10 minutes to 24 hours at a temperature of 0° C. to 90° C. with a saccharide component comprising at least one monosaccharide and at least one oligosaccharide, wherein a vehicle comprises the saccharide component in a solution, and
    enclosing a core including volatile constituents in the impregnated wooden pencil casing to produce at least one pencil, wherein at least 90% by weight of the volatile constituents are retained in the core by the impregnated wooden pencil casing.

18. The method according to claim 17, wherein the at least one oligosaccharide is constructed of glucose units.

19. The method according to claim 18, wherein the at least one oligosaccharide constructed of glucose units comprises maltodextrin.

20. The method according to claim 19, wherein the saccharide component further comprises at least one disaccharide.

21. The method according to claim 20, wherein the saccharide component further comprises polyvinyl alcohol.

22. The method according to claim 17, wherein the saccharide component further comprises a polyol selected from the group consisting of: pentaerythritol, polyvinyl alcohol, and a combination thereof.

23. The method according to claim 17, wherein the volatile constituents include at least one of volatile silicones and volatile hydrocarbons.

* * * * *